United States Patent
Pape

(10) Patent No.: US 9,978,088 B2
(45) Date of Patent: May 22, 2018

(54) APPLICATION INDEPENDENT DEX/UCS INTERFACE

(71) Applicant: Hand Held Products, Inc., Fort Mill, SC (US)

(72) Inventor: Philip P. Pape, Hiawatha, IA (US)

(73) Assignee: Hand Held Products, Inc., Fort Mill, SC (US)

( * ) Notice: Subject to any disclaimer, the term of this patent is extended or adjusted under 35 U.S.C. 154(b) by 365 days.

(21) Appl. No.: 14/707,123

(22) Filed: May 8, 2015

(65) Prior Publication Data

US 2016/0328762 A1    Nov. 10, 2016

(51) Int. Cl.
| | |
|---|---|
| *G07B 17/00* | (2006.01) |
| *G07F 19/00* | (2006.01) |
| *G06Q 30/04* | (2012.01) |
| *G06Q 50/28* | (2012.01) |
| *G06Q 20/20* | (2012.01) |
| *G06F 15/16* | (2006.01) |
| *G06F 15/00* | (2006.01) |
| *G06Q 20/40* | (2012.01) |
| *G06Q 20/00* | (2012.01) |

(52) U.S. Cl.
CPC ............. *G06Q 30/04* (2013.01); *G06Q 50/28* (2013.01); *G06F 15/00* (2013.01); *G06F 15/16* (2013.01); *G06Q 20/00* (2013.01); *G06Q 20/20* (2013.01); *G06Q 20/40* (2013.01)

(58) Field of Classification Search
CPC ......... G06F 15/16; G06F 15/00; G06Q 20/00; G06Q 20/40; G06Q 20/04; G06Q 20/20; G06Q 10/08; H04N 2201/0013; H04N 1/00204

USPC ....... 358/1.15, 400; 709/217, 203, 224, 230, 709/219, 204; 705/13, 28, 30, 39, 64
See application file for complete search history.

(56) References Cited

U.S. PATENT DOCUMENTS

| | | | |
|---|---|---|---|
| 6,832,725 B2 | 12/2004 | Gardiner et al. | |
| 7,128,266 B2 | 10/2006 | Marlton et al. | |
| 7,159,783 B2 | 1/2007 | Walczyk et al. | |
| 7,413,127 B2 | 8/2008 | Ehrhart et al. | |
| 7,444,401 B1 * | 10/2008 | Keyghobad | ......... H04L 12/2818 455/41.2 |
| 7,726,575 B2 | 6/2010 | Wang et al. | |

(Continued)

FOREIGN PATENT DOCUMENTS

| | | |
|---|---|---|
| WO | 2013163789 A1 | 11/2013 |
| WO | 2013173985 A1 | 11/2013 |

(Continued)

OTHER PUBLICATIONS

U.S. Appl. No. 13/367,978, filed Feb. 7, 2012, (Feng et al.); now abandoned.

(Continued)

*Primary Examiner* — Olusegun Goyea
(74) *Attorney, Agent, or Firm* — Additon, Higgins & Pendleton, P.A.

(57) ABSTRACT

Systems, methods, and devices are described for an application independent DEX/UCS interface (AIDI). The AIDI is a "plug and play" DEX/UCS solution that removes the requirement for developers to know the structure, function, and format of DEX/UCS transaction sets and to make the DEX/UCS process independent from the existing business logic of many mobile applications.

22 Claims, 9 Drawing Sheets

(56) References Cited

U.S. PATENT DOCUMENTS

| | | |
|---|---|---|
| 8,294,969 B2 | 10/2012 | Plesko |
| 8,317,105 B2 | 11/2012 | Kotlarsky et al. |
| 8,322,622 B2 | 12/2012 | Suzhou et al. |
| 8,366,005 B2 | 2/2013 | Kotlarsky et al. |
| 8,371,507 B2 | 2/2013 | Haggerty et al. |
| 8,376,233 B2 | 2/2013 | Van Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,736,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |

(56) References Cited

U.S. PATENT DOCUMENTS

| | | |
|---|---|---|
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 2002/0016829 A1* | 2/2002 | Defosse ............... G06Q 20/04 709/217 |
| 2002/0156727 A1* | 10/2002 | LeVake ............... G06Q 20/04 705/39 |
| 2004/0037273 A1* | 2/2004 | Lobig ............... H04M 7/0069 370/356 |
| 2005/0088686 A1* | 4/2005 | Tanimoto ........... H04N 1/00204 358/1.15 |
| 2006/0161473 A1* | 7/2006 | Defosse ............... G06Q 10/087 705/13 |
| 2007/0063048 A1 | 3/2007 | Havens et al. |
| 2009/0134221 A1 | 5/2009 | Zhu et al. |
| 2010/0146047 A1* | 6/2010 | Grieder ............... G06Q 10/087 709/204 |
| 2010/0146050 A1* | 6/2010 | Grieder ............... G06F 17/2264 709/204 |
| 2010/0146281 A1* | 6/2010 | Grieder ............... H04L 63/061 713/175 |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0169999 A1 | 7/2011 | Grunow et al. |
| 2011/0202554 A1 | 8/2011 | Powilleit et al. |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0221468 A1* | 8/2012 | Kumnick ............... G06Q 20/20 705/44 |
| 2012/0223141 A1 | 9/2012 | Good et al. |
| 2013/0043312 A1 | 2/2013 | Van Horn |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308625 A1 | 11/2013 | Corcoran |
| 2013/0313324 A1 | 11/2013 | Koziol et al. |
| 2013/0313325 A1 | 11/2013 | Wilz et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0025584 A1 | 1/2014 | Liu et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Li et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0121438 A1 | 5/2014 | Kearney |
| 2014/0121445 A1 | 5/2014 | Ding et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131441 A1 | 5/2014 | Nahill et al. |
| 2014/0131443 A1 | 5/2014 | Smith |
| 2014/0131444 A1 | 5/2014 | Wang |
| 2014/0131448 A1 | 5/2014 | Xian et al. |
| 2014/0133379 A1 | 5/2014 | Wang et al. |

(56) References Cited

U.S. PATENT DOCUMENTS

| | | |
|---|---|---|
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Lui et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071818 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chen et al. |
| 2015/0169929 A1 | 6/2015 | Williams et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |

FOREIGN PATENT DOCUMENTS

| | | |
|---|---|---|
| WO | 2014019130 A1 | 2/2014 |
| WO | 2014110495 A1 | 7/2014 |

OTHER PUBLICATIONS

U.S. Appl. No. 14/462,801 for Mobile Computing Device With Data Cognition Software, filed Aug. 19, 2014 (Todeschini et al.); 38 pages.

U.S. Appl. No. 14/596,757 for System and Method for Detecting Barcode Printing Errors filed Jan. 14, 2015 (Ackley); 41 pages.

U.S. Appl. No. 14/277,337 for Multipurpose Optical Reader, filed May 14, 2014 (Jovanovski et al.); 59 pages.

U.S. Appl. No. 14/200,405 for Indicia Reader for Size-Limited Applications filed Mar. 7, 2014 (Feng et al.); 42 pages.

U.S. Appl. No. 14/662,922 for Multifunction Point of Sale System filed Mar. 19, 2015 (Van Horn et al.); 41 pages.

U.S. Appl. No. 14/446,391 for Multifunction Point of Sale Apparatus With Optical Signature Capture filed Jul. 30, 2014 (Good et al.); 37 pages.

U.S. Appl. No. 29/528,165 for In-Counter Barcode Scanner filed May 27, 2015 (Oberpriller et al.); 13 pages.

U.S. Appl. No. 29/528,890 for Mobile Computer Housing filed Jun. 2, 2015 (Fitch et al.); 61 pages.

U.S. Appl. No. 14/614,796 for Cargo Apportionment Techniques filed Feb. 5, 2015 (Morton et al.); 56 pages.

U.S. Appl. No. 29/516,892 for Table Computer filed Feb. 6, 2015 (Bidwell et al.); 13 pages.

U.S. Appl. No. 29/523,098 for Handle for a Tablet Computer filed Apr. 7, 2015 (Bidwell et al.); 17 pages.

U.S. Appl. No. 14/578,627 for Safety System and Method filed Dec. 22, 2014 (Ackley et al.); 32 pages.

U.S. Appl. No. 14/573,022 for Dynamic Diagnostic Indicator Generation filed Dec. 17, 2014 (Goldsmith); 43 pages.

U.S. Appl. No. 14/529,857 for Barcode Reader With Security Features filed Oct. 31, 2014 (Todeschini et al.); 32 pages.

U.S. Appl. No. 14/519,195 for Handheld Dimensioning System With Feedback filed Oct. 21, 2014 (Laffargue et al.); 39 pages.

U.S. Appl. No. 14/519,211 for System and Method for Dimensioning filed Oct. 21, 2014 (Ackley et al.); 33 pages.

U.S. Appl. No. 14/519,233 for Handheld Dimensioner With Data-Quality Indication filed Oct. 21, 2014 (Laffargue et al.); 36 pages.

(56) References Cited

OTHER PUBLICATIONS

U.S. Appl. No. 14/533,319 for Barcode Scanning System Using Wearable Device With Embedded Camera filed Nov. 5, 2014 (Todeschini); 29 pages.
U.S. Appl. No. 14/748,446 for Cordless Indicia Reader With a Multifunction Coil for Wireless Charging and EAS Deactivation, filed Jun. 24, 2015 (Xie et al.); 34 pages.
U.S. Appl. No. 29/528,590 for Electronic Device filed May 29, 2015 (Fitch et al.); 9 pages.
U.S. Appl. No. 14/519,249 for Handheld Dimensioning System With Measurement-Conformance Feedback filed Oct. 21, 2014 (Ackley et al.); 36 pages.
U.S. Appl. No. 29/519,017 for Scanner filed Mar. 2, 2015 (Zhou et al.); 11 pages.
U.S. Appl. No. 14/398,542 for Portable Electronic Devices Having a Separate Location Trigger Unit for Use in Controlling an Application Unit filed Nov. 3, 2014 (Sian et al.); 22 pages.
U.S. Appl. No. 14/405,278 for Design Pattern for Secure Store filed Mar. 9, 2015 (Zhu et al.); 23 pages.
U.S. Appl. No. 14/590,024 for Shelving and Package Locating Systems for Delivery Vehicles filed Jan. 6, 2015 (Payne); 31 pages.
U.S. Appl. No. 14/568,305 for Auto-Contrast Viewfinder for an Indicia Reader filed Dec. 12, 2014 (Todeschini); 29 pages.
U.S. Appl. No. 29/526,918 for Charging Base filed May 14, 2015 (Fitch et al.); 10 pages.
U.S. Appl. No. 14/580,262 for Media Gate for Thermal Transfer Printers filed Dec. 23, 2014 (Bowles); 36 pages.
DEX Delivery System for Pre-Sell Distributors, Baus Systems website, downloaded Oct. 20, 2015, 3 pages.
'Dex in a Box' Launched by Versatile Mobile Systems; Next Generation of DEX Software Allows Small to medium DSD Suppliers to Gain Benefits, download from TheFreeLibrary.com, Dated Oct. 25, 2002; Downloaded Oct. 20, 2015, 3 pages.
U.S. Appl. No. 14/519,179 for Dimensioning System With Multipath Interference Mitigation filed Oct. 21, 2014 (Thuries et al.); 30 pages.
U.S. Appl. No. 14/264,173 for Autofocus Lens System for Indicia Readers filed Apr. 29, 2014, (Ackley et al.); 39 pages.
U.S. Appl. No. 14/453,019 for Dimensioning System With Guided Alignment, filed Aug. 6, 2014 (Li et al.); 31 pages.
U.S. Appl. No. 14/452,697 for Interactive Indicia Reader , filed Aug. 6, 2014, (Todeschini); 32 pages.
U.S. Appl. No. 14/231,898 for Hand-Mounted Indicia-Reading Device with Finger Motion Triggering filed Apr. 1, 2014 (Van Horn et al.); 36 pages.
U.S. Appl. No. 14/715,916 for Evaluating Image Values filed May 19, 2015 (Ackley); 60 pages.
U.S. Appl. No. 14/513,808 for Identifying Inventory Items in a Storage Facility filed Oct. 14, 2014 (Singel et al.); 51 pages.
U.S. Appl. No. 29/458,405 for an Electronic Device, filed Jun. 19, 2013 (Fitch et al.); 22 pages.
U.S. Appl. No. 29/459,620 for an Electronic Device Enclosure, filed Jul. 2, 2013 (London et al.); 21 pages.
U.S. Appl. No. 14/483,056 for Variable Depth of Field Barcode Scanner filed Sep. 10, 2014 (McCloskey et al.); 29 pages.
U.S. Appl. No. 14/531,154 for Directing an Inspector Through an Inspection filed Nov. 3, 2014 (Miller et al.); 53 pages.
U.S. Appl. No. 29/525,068 for Tablet Computer With Removable Scanning Device filed Apr. 27, 2015 (Schulte et al.); 19 pages.
U.S. Appl. No. 29/468,118 for an Electronic Device Case, filed Sep. 26, 2013 (Oberpriller et al.); 44 pages.
U.S. Appl. No. 14/340,627 for an Axially Reinforced Flexible Scan Element, filed Jul. 25, 2014 (Reublinger et al.); 41 pages.
U.S. Appl. No. 14/676,327 for Device Management Proxy for Secure Devices filed Apr. 1, 2015 (Yeakley et al.); 50 pages.
U.S. Appl. No. 14/257,364 for Docking System and Method Using Near Field Communication filed Apr. 21, 2014 (Showering); 31 pages.
U.S. Appl. No. 14/327,827 for a Mobile-Phone Adapter for Electronic Transactions, filed Jul. 10, 2014 (Hejl); 25 pages.
U.S. Appl. No. 14/334,934 for a System and Method for Indicia Verification, filed Jul. 18, 2014 (Hejl); 38 pages.
U.S. Appl. No. 29/530,600 for Cyclone filed Jun. 18, 2015 (Vargo et al); 16 pages.
U.S. Appl. No. 14/707,123 for Application Independent DEX/UCS Interface filed May 8, 2015(Pape); 47 pages.
U.S. Appl. No. 14/283,282 for Terminal Having Illumination and Focus Control filed May 21, 2014 (Liu et al.); 31 pages.
U.S. Appl. No. 14/619,093 for Methods for Training a Speech Recognition System filed Feb. 11, 2015 (Pecorari); 35 pages.
U.S. Appl. No. 29/524,186 for Scanner filed Apr. 17, 2015 (Zhou et al.); 17 pages.
U.S. Appl. No. 14/705,407 for Method and System to Protect Software-Based Network-Connected Devices From Advanced Persistent Threat filed May 6, 2015 (Hussey et al.); 42 pages.
U.S. Appl. No. 14/614,706 for Device for Supporting an Electronic Tool on a User's Hand filed Feb. 5, 2015 (Oberpriller et al.); 33 pages.
U.S. Appl. No. 14/628,708 for Device, System, and Method for Determining the Status of Checkout Lanes filed Feb. 23, 2015 (Todeschini); 37 pages.
U.S. Appl. No. 14/704,050 for Intermediate Linear Positioning filed May 5, 2015 (Charpentier et al.); 60 pages.
U.S. Appl. No. 14/529,563 for Adaptable Interface for a Mobile Computing Device filed Oct. 31, 2014 (Schoon et al.); 36 pages.
U.S. Appl. No. 14/705,012 for Hands-Free Human Machine Interface Responsive to a Driver of a Vehicle filed May 6, 2015 (Fitch et al.); 44 pages.
U.S. Appl. No. 14/715,672 for Augumented Reality Enabled Hazard Display filed May 19, 2015 (Venkatesha et al.); 35 pages.
U.S. Appl. No. 14/695,364 for Medication Management System filed Apr. 24, 2015 (Sewell et al.); 44 pages.
U.S. Appl. No. 14/664,063 for Method and Application for Scanning a Barcode With a Smart Device While Continuously Running and Displaying an Application on the Smart Device Display filed Mar. 20, 2015 (Todeschini); 37 pages.
U.S. Appl. No. 14/735,717 for Indicia-Reading Systems Having an Interface With a User's Nervous System filed Jun. 10, 2015 (Todeschini); 39 pages.
U.S. Appl. No. 14/527,191 for Method and System for Recognizing Speech Using Wildcards in an Expected Response filed Oct. 29, 2014 (Braho et al.); 45 pages.
U.S. Appl. No. 14/702,110 for System and Method for Regulating Barcode Data Injection Into a Running Application on a Smart Device filed May 1, 2015 (Todeschini et al.); 38 pages.
U.S. Appl. No. 14/535,764 for Concatenated Expected Responses for Speech Recognition filed Nov. 7, 2014 (Braho et al.); 51 pages.
U.S. Appl. No. 14/687,289 for System for Communication Via a Peripheral Hub filed Apr. 15, 2015 (Kohtz et al.); 37 pages.
U.S. Appl. No. 14/747,197 for Optical Pattern Projector filed Jun. 23, 2015 (Thuries et al.); 33 pages.
U.S. Appl. No. 14/674,329 for Aimer for Barcode Scanning filed Mar. 31, 2015 (Bidwell); 36 pages.
U.S. Appl. No. 14/702,979 for Tracking Battery Conditions filed May 4, 2015 (Young et al.); 70 pages.
U.S. Appl. No. 29/529,441 for Indicia Reading Device filed Jun. 8, 2015 (Zhou et al.); 14 pages.
U.S. Appl. No. 14/747,490 for Dual-Projector Three-Dimensional Scanner filed Jun. 23, 2015 (Jovanovski et al.); 40 pages.
U.S. Appl. No. 14/740,320 for Tactile Switch for a Mobile Electronic Device filed Jun. 16, 2015 (Barndringa); 38 pages.
U.S. Appl. No. 14/695,923 for Secure Unattended Network Authentication filed Apr. 24, 2015 (Kubler et al.); 52 pages.
U.S. Appl. No. 14/740,373 for Calibrating a Volume Dimensioner filed Jun. 16, 2015 (Ackley et al.); 63 pages.

* cited by examiner

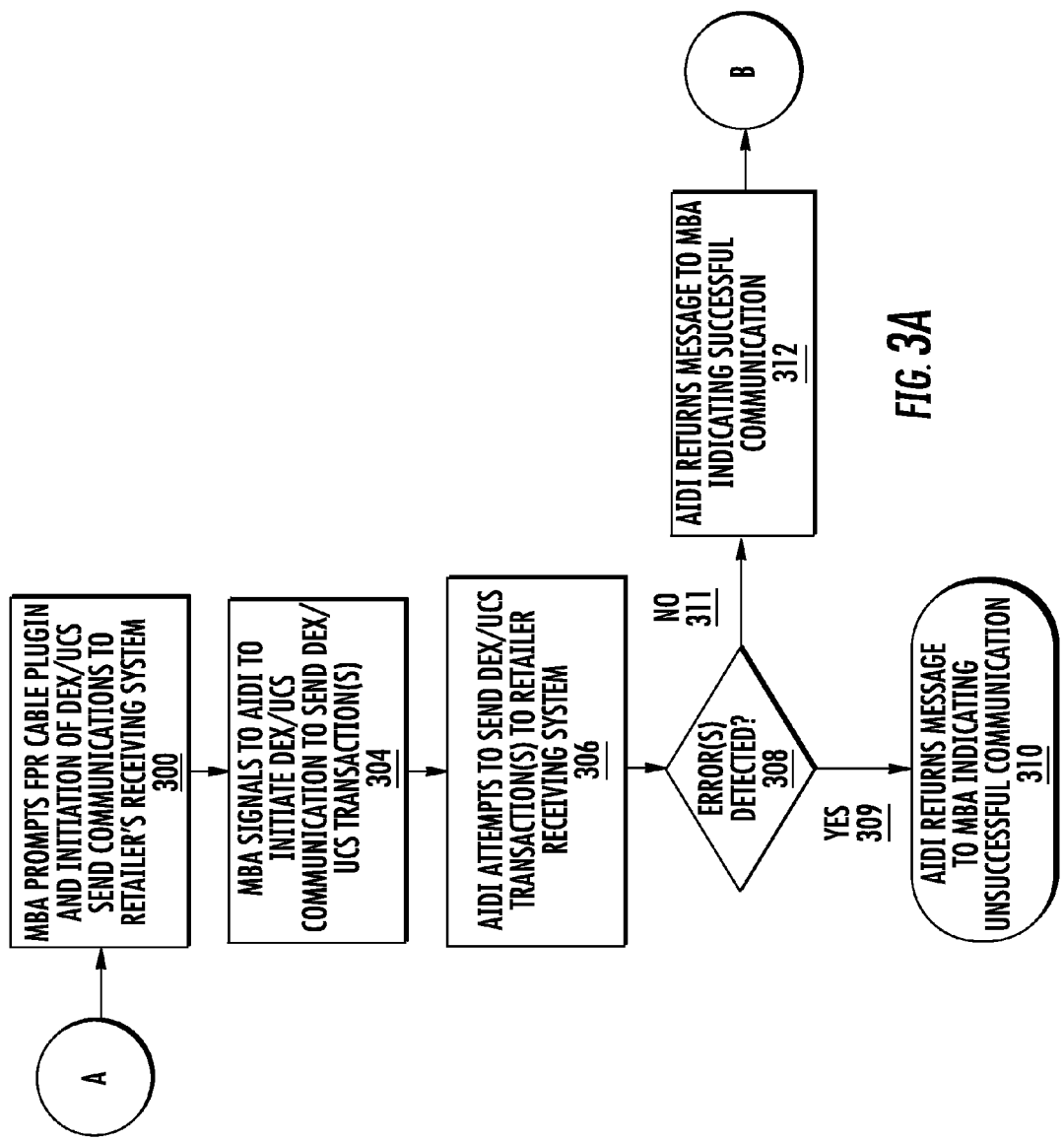

APPLICATION INDEPENDENT DEX/UCS INTERFACE

FIELD OF THE INVENTION

The present invention is related to an application independent Direct Exchange/Uniform Communication Standard (DEX/UCS) interface designed primarily, but not exclusively, for buyers and suppliers using direct store delivery (DSD).

BACKGROUND

Many years ago, grocery stores and large retailers initiated the development of standards and technologies for receiving inventory and accepting and reconciling invoices from multiple vendors. Use of structured digital data and standard communication interfaces for exchanging purchase and delivery information was much faster than traditional hand-written invoices. Many DSD suppliers also recognized the benefits of these technologies and adopted them quickly because it allowed drivers to make deliveries and reconcile discrepancies and invoicing errors with the customer at time of delivery, as opposed to the more costly process of reconciling after the delivery.

The DEX/UCS standard remains a vital part of the retail environment today. However, new problems have emerged. Recent advances in mobile consumer electronics, particularly the power, flexibility, and convenience of smartphones and tablets, have led many DSD suppliers to transition to new devices for their drivers. In many cases, this transition has necessitated a redevelopment of many of the mobile applications currently used by DSD suppliers to adapt them for these new operating systems and devices. Many companies now supply hardware and/or software for the DEX/UCS standard, including, but not limited to, the DEX Toolkit for .NET® Development by Intermec, Inc. (a subsidiary of Honeywell International, Inc.). Even with such robust tools available to help master DEX/UCS transactions for retail, developers need to acquire specific knowledge of the DEX/UCS process, structure, function, and format of the transactions sets used in order to truly integrate it into new or existing mobile applications with data constraints or defined user interfaces. In some instances, developers may also need to understand the communications protocols used to send and receive DEX/UCS data. Acquiring such a knowledge-base can be costly and time consuming.

Therefore, there is a need for a "plug and play" DEX/UCS solution that removes the requirement for developers to know the structure, function, and format of DEX/UCS transaction sets and to make the DEX/UCS process independent from the existing business logic of many mobile applications.

SUMMARY

Accordingly, one aspect of the present invention discloses a device with at least one communication interface, at least one storage repository, and a control system communicatively coupled to the at least one communication interface and the at least one storage repository and comprising at least one hardware processor and a memory storing at least one first program code and at least one second program code, wherein: the at least one first program code is operable to: receive transaction information; create a first data file in the storage repository, wherein the first data file is based on the transaction information; send a message to the at least one second program code to initiate a creation of the transaction information in an exchange format; receive a message from the at least one second program code denoting success or failure of the creation of the transaction information in the exchange format; and the at least one second program code is operable to: receive a message from the at least one first program code to initiate a creation of the transaction information in the exchange format; read the transaction information from the first data file; and create the transaction information in the exchange format; send a message to the at least one first program code denoting success or failure of the creation of the transaction information in the exchange format.

In other exemplary embodiments, the at least one first program code is further operable to: issue a prompt for a connection to a second device; send a signal to the second program code to initiate a communication of the transaction information in an exchange format; receive a message from the at least one second program code denoting success or failure of the communication of the transaction information in the exchange format; and the at least one second program code is further operable to: receive a message from the at least one first program code to initiate the communication of the transaction information in the exchange format; exchange the transaction information with the second device; and send a message to the at least one first program code denoting success or failure of the communication of the transaction information to the second device.

In additional exemplary embodiments, the at least one first program code is further operable to: receive a message from the at least second program code including information about a second data file; read the second data file; update acknowledged transactions; display transactions that require reconciliation; determine if there is additional transaction information; if there is additional transaction information, receive the additional transaction information and create a third data file in the storage repository, wherein the third data file is based on the additional transaction information; and the at least one second program code is further operable to: analyze the transaction information exchanged with the second device; create the second data file in the storage repository, wherein the second data file is based on analyzed transaction information; and send a message to the at least one first program code including information about the second data file.

A further aspect of the present invention discloses a system, comprising: a first device comprising: at least one communication interface; at least one storage repository; a control system communicatively coupled to the at least one communication interface and the at least one storage repository and comprising at least one hardware processor and a memory storing program codes operable to: receive transaction information; create a first data file in the storage repository, wherein the first data file is based on the transaction information; send a message to the at least one second program code to initiate a creation of the transaction information in an exchange format; receive a message from the at least one second program code denoting success or failure of the creation of the transaction information in the exchange format; and a second device comprising: at least one communication interface; at least one storage repository; a control system communicatively coupled to the at least one communication interface and the at least one storage repository and comprising at least one hardware processor and a memory storing program codes operable to: receive a message from the at least one first program code to initiate a creation of the transaction information in the exchange format; read the transaction information from the first data file; and create the transaction information in the exchange format; send a message to the at least one first program code denoting success or failure of the creation of the transaction information in the exchange format.

In other exemplary embodiments of the present invention, the control system of the first device is further operable to: issue a prompt for a connection to a third device; send a signal to the second program code to initiate a communication of the transaction information in an exchange format; receive a message from the at least one second program code denoting success or failure of the communication of the transaction information in the exchange format; and the control system of the second device is further operable to: receive a message from the at least one first program code to initiate the communication of the transaction information in the exchange format; exchange the transaction information with the third device; and send a message to the at least one first program code denoting success or failure of the communication of the transaction information to the third device.

And in further exemplary embodiments, the control system of the first device is further operable to: receive a message from the at least second program code including information about a second data file; read the second data file; update acknowledged transactions; display transactions that require reconciliation; determine if there is additional transaction information; if there is additional transaction information, receive the additional transaction information and create a third data file in the storage repository, wherein the third data file is based on the additional transaction information; and the control system of the second device is further operable to: analyze the transaction information exchanged with the third device; create the second data file in the storage repository, wherein the second data file is based on analyzed transaction information; and send a message to the at least one first program code including information about the second data file.

Another aspect of the present invention discloses a computer-implemented method that receives transaction information, creates a first data file, wherein the first data file is based on the transaction information, reads the transaction information from the first data file, creates the transaction information in an exchange format, exchanges the transaction information, analyzes the exchanged transaction information, creates a second data file, wherein the second data file is based on the exchanged transaction information, updates acknowledged transactions, displays transactions that require reconciliation, determines if there is additional transaction information, if there is additional transaction information, receives the additional transaction information and creates a third data file, wherein the third data file is based on the additional transaction information.

In one exemplary embodiment of the present invention, the transaction information is selected from the group consisting of: sales information, return information, adjustment information, and counter-adjustment information.

In another exemplary embodiment of the present invention, the message is of a type selected from the group consisting of: a signal, an inter-process communication, and a notification.

In a further exemplary embodiment of the present invention, the exchange format is Direct Exchange (DEX)/Uniform Communication Standard (UCS) administered by GS1.

In other exemplary embodiments of the present invention, the communication is of a type selected from the group of: a sending communication and a receiving communication.

In still further exemplary embodiments of the present invention, the additional transaction information is selected from the group consisting of: sales information, return information, adjustment information, and counter-adjustment information.

In alternative exemplary embodiments of the present invention, the third data file and the first data file are the same file.

In yet additional exemplary embodiments of the present invention, the information about the second data file includes the location of the file in the storage repository.

And in further exemplary embodiments of the present invention, the information about the second data file is the contents of the second data file.

The foregoing illustrative summary, as well as other exemplary objectives and/or advantages of the invention, and the manner in which the same are accomplished, are further explained within the following detailed description and its accompanying drawings.

BRIEF DESCRIPTION OF THE DRAWINGS

FIG. 3A is a flow chart and FIG. 3B is a corresponding schematic of the data send process according to one embodiment of the disclosed subject matter.

DETAILED DESCRIPTION

The present invention describes a mechanism to add DEX/UCS capability (e.g. the DEX/UCS standards administered by GS1) to any device for use with a mobile Direct Store Delivery (DSD) application or any other mobile application, including, but not limited to, a field service application. More specifically, the DEX/UCS standards administered by GS1.

Figure 1:
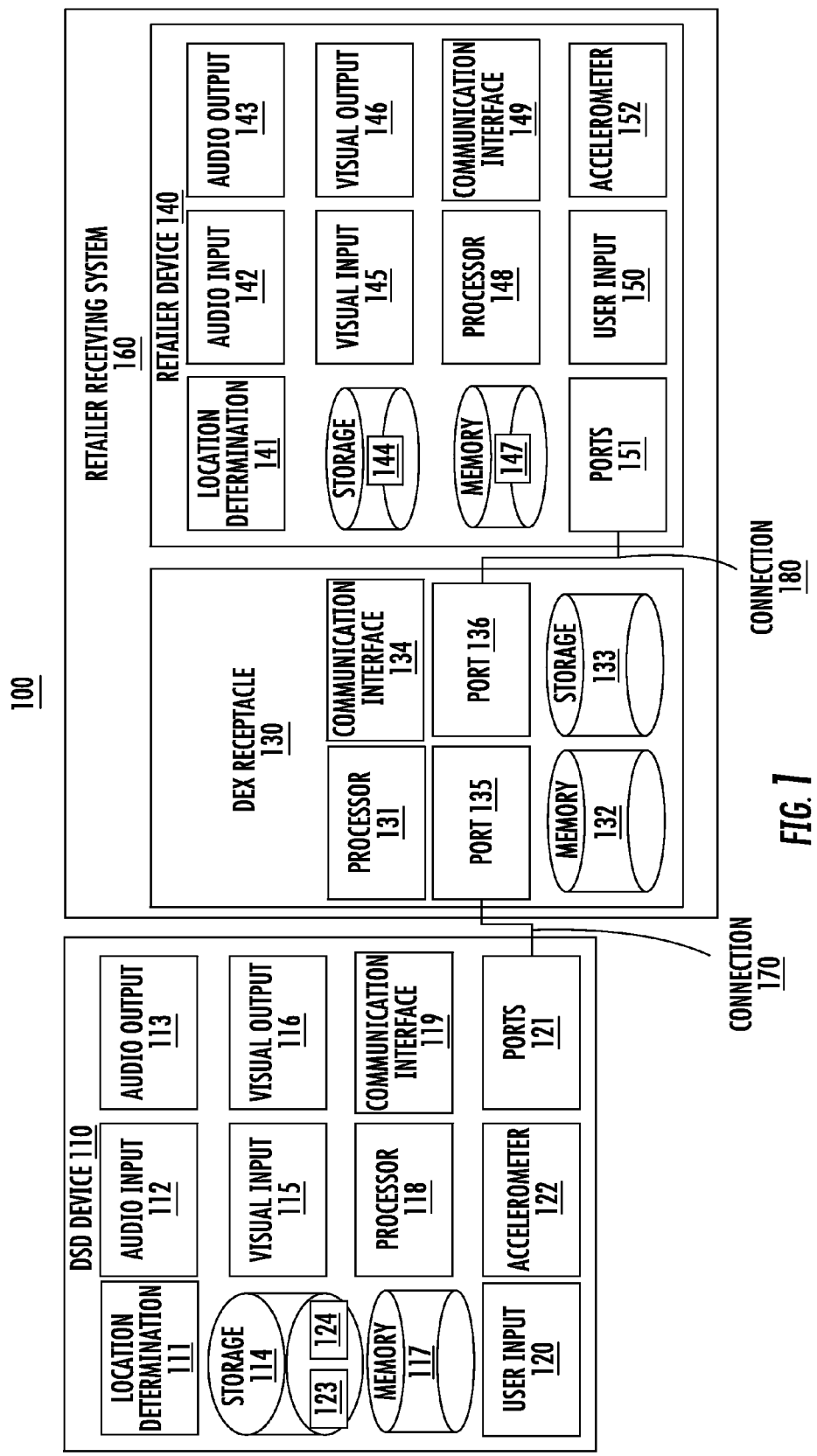
FIG. 1 is a block diagram of the hardware elements of the system in accordance with embodiments of the disclosed subject matter.

FIG. 1 illustrates an exemplary system 100 for one embodiment of the present invention. In general, the system 100 includes a DSD device 110 and a retailer receiving system 160 comprising a DEX receptacle 130 and a retailer device 140. The DSD device 110 and retailer device 140 may be implemented in any form of digital computer or mobile device. Digital computers may include, but are not limited to, laptops, desktops, workstations, fixed vehicle computers, vehicle mount computers, hazardous environment computers, rugged mobile computers, servers, blade servers, mainframes, other appropriate computers. Mobile devices may include, but are not limited to, cellular telephones, smart phones, personal digital assistants, tablets, pagers, two-way radios, netbooks, barcode scanners, radio frequency identification (RFID) readers, intelligent sensors, tracking devices, and other similar computing devices.

In some embodiments of the present invention, the DSD device 110 connects to the retailer receiving system 160 through the DEX receptacle 130 via the connection 170. In some embodiments, the connection 170 is a serial connection using a cable with a ¼ inch stereo jack connector. In other embodiments, the connection 170 may include other wired components, such as Ethernet, and/or wireless components, such as LTE, Wi-Fi, Bluetooth, or near field communication (NFC), or any combination of wired and wireless components.

In some embodiments of the present invention, the DEX receptacle 130 connects to the retailer device 140 via the connection 180. In some embodiments, the connection 180 is a serial connection or Universal Serial Bus (USB) connection. In other embodiments, the connection 180 may include other wired components, such as Ethernet, and/or wireless components, such as LTE, Wi-Fi, Bluetooth, or near field communication (NFC), or any combination of wired and wireless components.

Note that while the DEX receptacle 130 and retailer device 140 are illustrated in FIG. 1 as distinct devices, each may alternatively be distributed across multiple devices having the respective functionality of the DEX receptacle 130 and retailer device 140. In yet other embodiments, the DEX receptacle 130 and retailer device 140 may be combined into one single device or distributed across multiple devices having the overall combined functionality of the DEX receptacle 130 and the retailer device 140.

In general, the DSD device 110 includes a processor 118 such as a Qualcomm MSM 7500 multi-processor, associated memory 117 such as flash memory and/or random access memory (RAM), ports 121 such as one or more serial and/or USB ports, a communication interface 119, such as a wired interface like Ethernet and/or a wireless interface such as Wi-Fi, Bluetooth or NFC, and a storage component 114 such as a hard drive or solid state drive. The DSD device 110 may include additional components like a location determination component 111 such as a Global Positioning System (GPS) chip, audio input component 112 such as a microphone, audio output component 113 such as a speaker, visual input component 115 such as a camera, barcode reader, or scanner, visual output component 116 such as a display, and a user input component 120 such as a touchscreen, navigation shuttle, soft keys, keyboard, and accelerometer 122. The components of DSD device 110 may be interconnected using one or more buses (not shown) and may be mounted on a motherboard (not shown) or some other appropriate configuration.

DSD device 110 also has one or more files stored in the storage component 114, including but not limited to a transaction data file 123 and an adjustments data file 124, as described below. Note, while transaction data file 123 and adjustments data file 124 are shown as individual respective files in FIG. 1, FIG. 2B, FIG. 3B, FIG. 4B, FIG. 5B, and FIG. 6B, in some embodiments, they may represent several separate files having the similar form of transaction data file 123 and adjustments data file 124, respectively. A non-limiting example of this may be seen in steps 204 of FIG. 2B, 600 of FIG. 6B, and 650 of FIG. 6B. In each of those steps, in some embodiments, the same transaction data file 123 is used. In other embodiments, each step creates a separate transaction data file 123.

In other embodiments, the transaction data file 123 and adjustments data file 124 may be stored in the storage component 133 of the DEX receptacle 130, the storage component 144 of the retailer device 140, or some combination therein.

Examples of DSD device 110 include but are not limited to the Intermec CN50 and CN51 mobile computers and the Intermec CN70 and CN70e ultra-rugged mobile computers.

In general, DEX receptacle 130 includes a processor 131 such as an ARM processor, memory 132 such as flash memory or RAM, a communication interface 134, such as a wired interface like Ethernet and/or a wireless interface such as Wi-Fi, Bluetooth or NFC, and one or more ports 135, 136 ports 121 such as one or more serial and/or USB ports. DEX receptacle 130 may also include a storage component 133 such as a hard drive or solid state drive.

In general, the retailer device 140 includes a processor 148 such as a Texas Instruments open multimedia applications platform (OMAP) multi-engine processor, associated memory 147 such as flash memory and/or random access memory (RAM), ports 151 such as one or more serial and/or USB ports, a communication interface 149, such as a wired interface like Ethernet and/or a wireless interface such as Wi-Fi, Bluetooth or NFC, and a storage component 144 such as a hard drive or solid state drive. The retailer device 140 may include additional components like a location determination component 141 such as a GPS chip, audio input component 142 such as a microphone, audio output component 143 such as a speaker, visual input component 145 such as a camera, barcode reader, or scanner, visual output component 146 such as a display, and a user input component 150 such as a touchscreen, navigation shuttle, soft keys, keyboard, and accelerometer 152. The components of retailer device 140 may be interconnected using one or more buses (not shown) and may be mounted on a motherboard (not shown) or some other appropriate configuration.

In one embodiment of the present invention, the application independent DEX/UCS interface (AIDI) is installed as a feature of the mobile business application (MBA) on the DSD device 110, where the MBA runs the AIDI as needed.

Figure 2A:
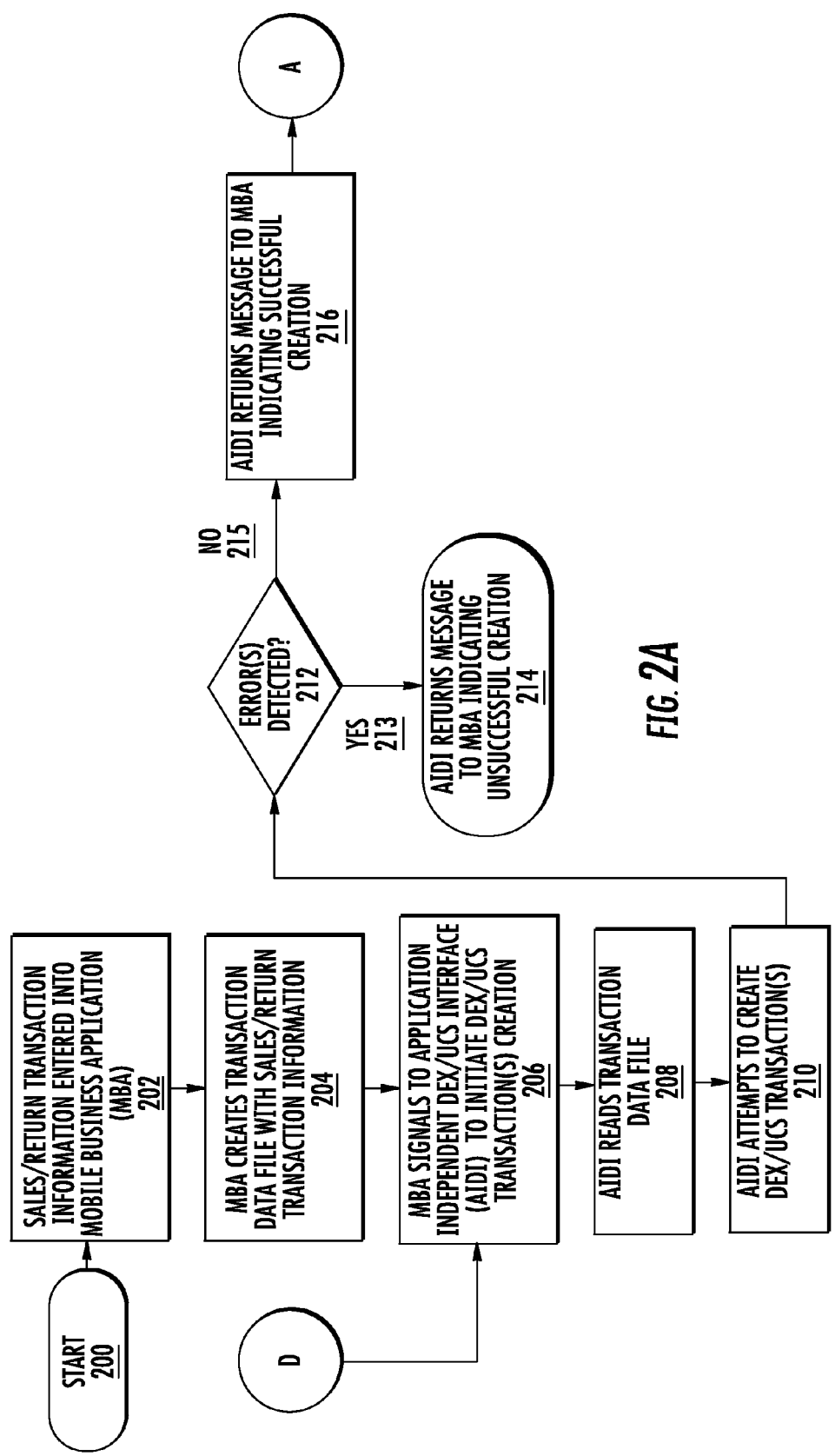
FIG. 2A is a flow chart and FIG. 2B is a corresponding schematic of the data creation process according to one embodiment of the disclosed subject matter.
Figure 2B:
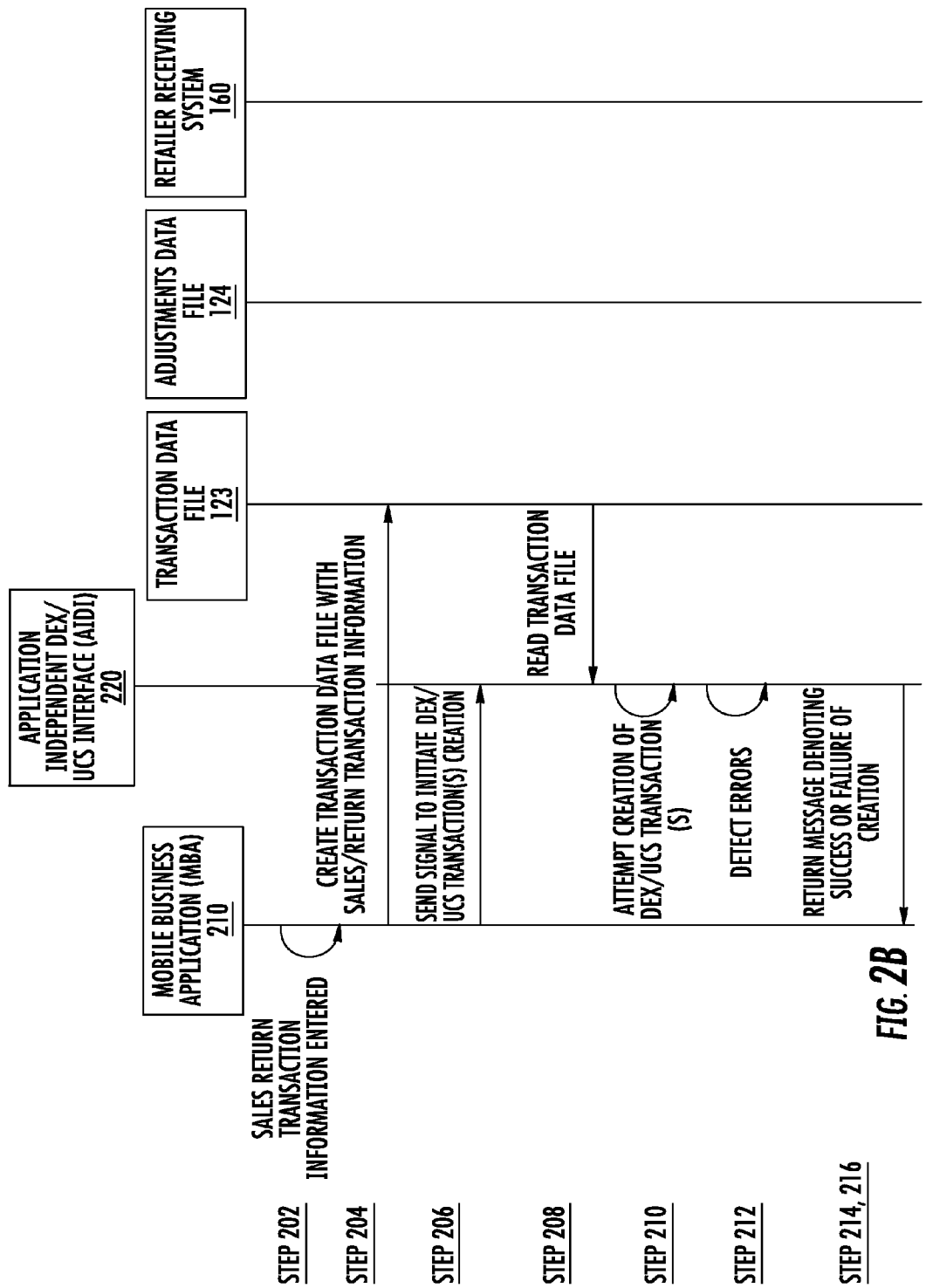

FIG. 2A is a flow chart and FIG. 2B is a corresponding schematic of the data creation process according to one embodiment of the disclosed subject matter. In FIG. 2A, the process begins at Step 200 when the user launches or invokes the MBA and AIDI on the DSD device 110. The MBA receives merchandise sales and/or return information (Step 202). The MBA then creates a transaction data file 123 with the sales and/or return information (step 204). The MBA then signals to the AIDI to initiate the creation of the DEX/UCS transaction(s) (Step 206). The AIDI reads the transaction data file 123 (Step 208), and then it attempts to create the DEX/UCS transaction(s) (Step 210). If any errors are detected during the creation process (Step 212), then the AIDI returns a message to the MBA denoting the failure to create the data (Step 214), and the process stops. Otherwise, as shown in Step 216, the AIDI returns a message to the MBA denoting a successful data creation. At this point, the process continues as indicated by the connector A.

Figure 3B:
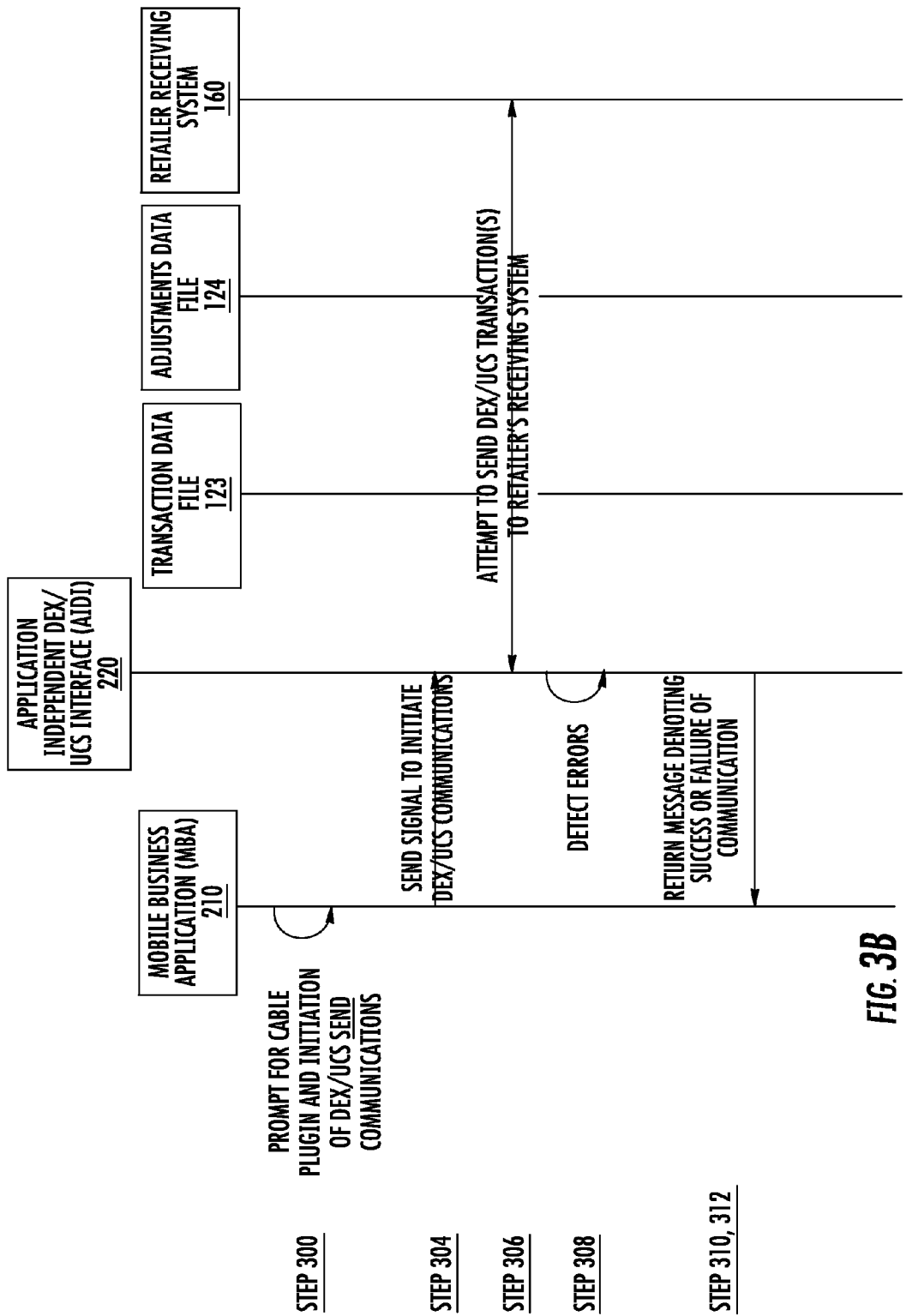

Connector A from FIG. 2A continues then in FIG. 3A. FIG. 3A is a flow chart and FIG. 3B is a corresponding schematic of the data send process according to one embodiment of the disclosed subject matter. The process continues in Step 300 with the MBA generating a prompt for the DSD device 110 to connect to the DEX receptacle 130 using, in one embodiment, a serial cable with a ¼ inch stereo jack connector, or some other mechanism as described above. The MBA also initiates the DEX/UCS send communications by sending a signal to the AIDI to initiate communications to send the DEX/UCS transaction(s) (Step 304). The AIDI then attempts to send the DEX/UCS transaction(s) to the retailer receiving system 160 through the DEX receptacle 130 (Step 306). If any errors are detected during the communication process (Step 308), then the AIDI returns a message to the MBA denoting the communication failure (Step 310), and the process stops. Otherwise, as shown in Step 312, the AIDI returns a message to the MBA denoting a successful communication. At this point, the process continues as indicated by the connector B.

Figure 4A:
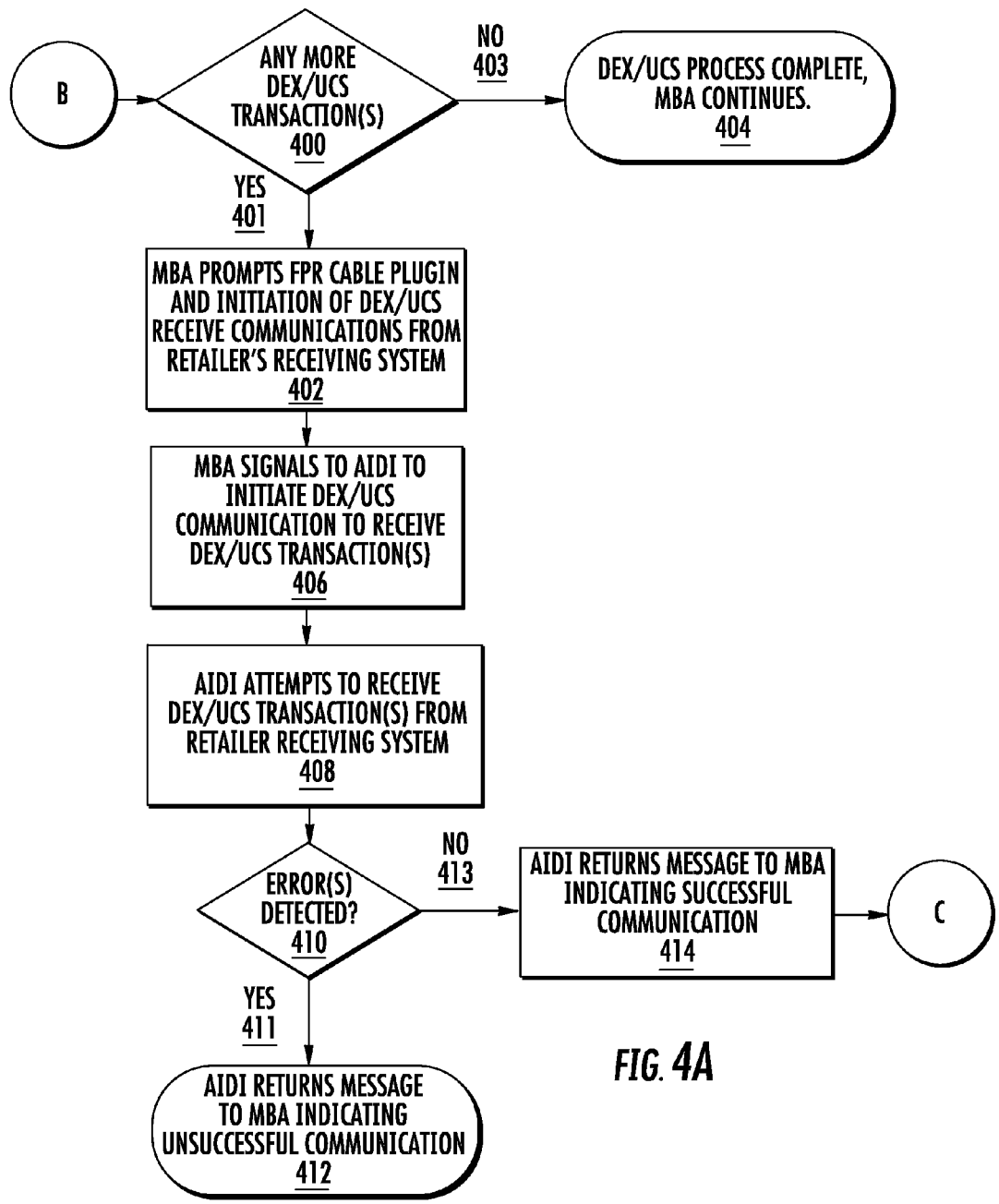
FIG. 4A is a flow chart and FIG. 4B is a corresponding schematic of the data receive process according to one embodiment of the disclosed subject matter.
Figure 4B:
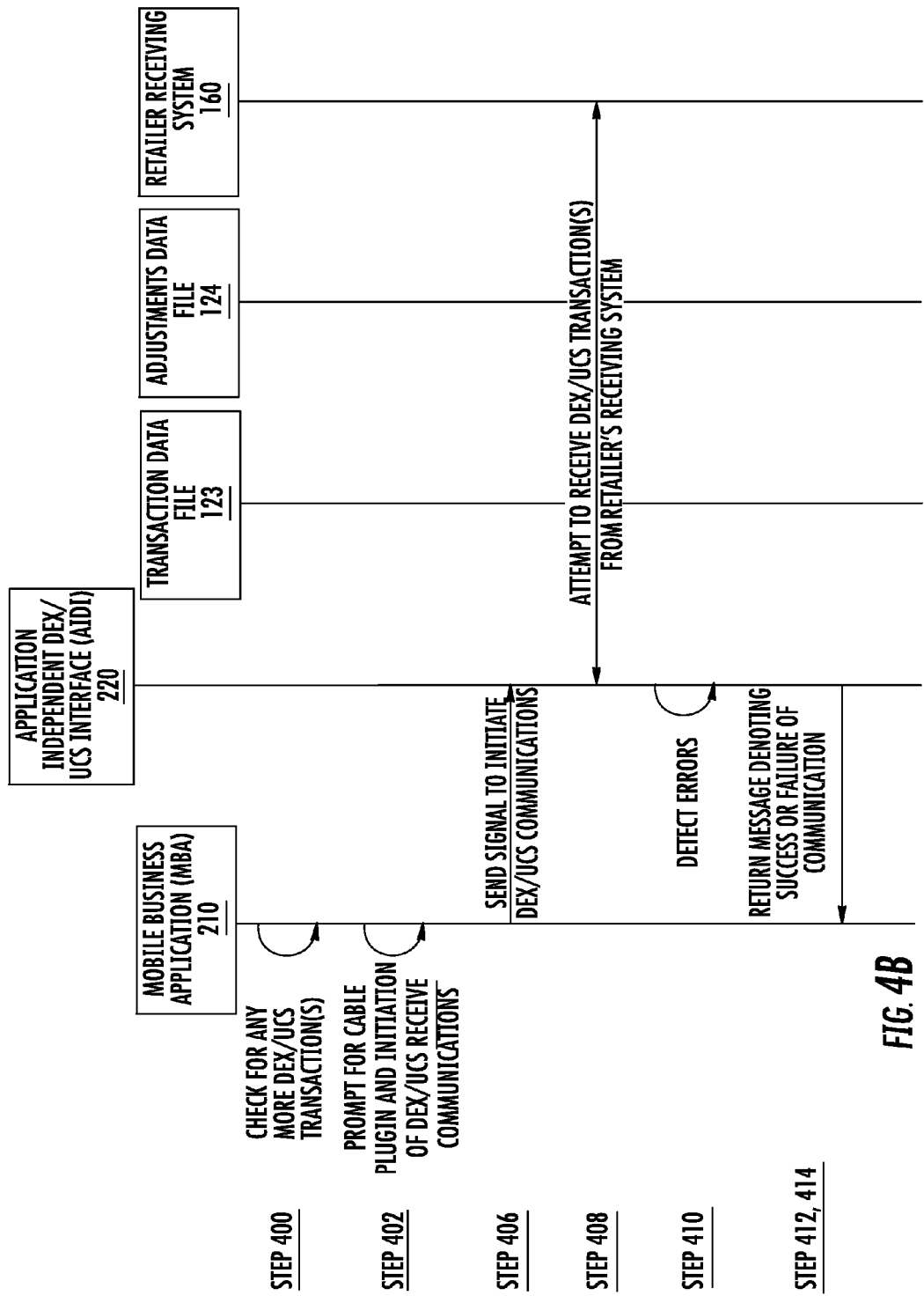

Connector B from FIG. 3A continues then in FIG. 4A. FIG. 4A is a flow chart and FIG. 4B is a corresponding schematic of the data receive process according to one embodiment of the disclosed subject matter. The MBA then checks to see if there are any more DEX/UCS transaction(s) (Step 400). If not, as shown in Step 404, then the DEX/UCS portion of the MBA is now complete. The MBA may continue to run on the DSD device 110, but it is no longer performing DEX/UCS transaction(s). If there are additional transaction(s), such as adjustments from the retailer, then the MBA will generate a prompt for the DSD device 110 to connect to the DEX receptacle 130, if it is not already still connected from earlier in the process. The MBA also initiates the DEX/UCS receive communications by sending a signal to the AIDI to initiate communications to receive the DEX/UCS transaction(s) (Step 406). The AIDI then attempts to receive the DEX/UCS transaction(s) from the retailer receiving system 160 through the DEX receptacle 130 (Step 408). If any errors are detected during the communication process (Step 410), then the AIDI returns a message to the MBA denoting the communication failure (Step 412), and the process stops. Otherwise, as shown in Step 414, the AIDI returns a message to the MBA denoting a successful communication. At this point, the process continues as indicated by the connector C.

Figure 5A:
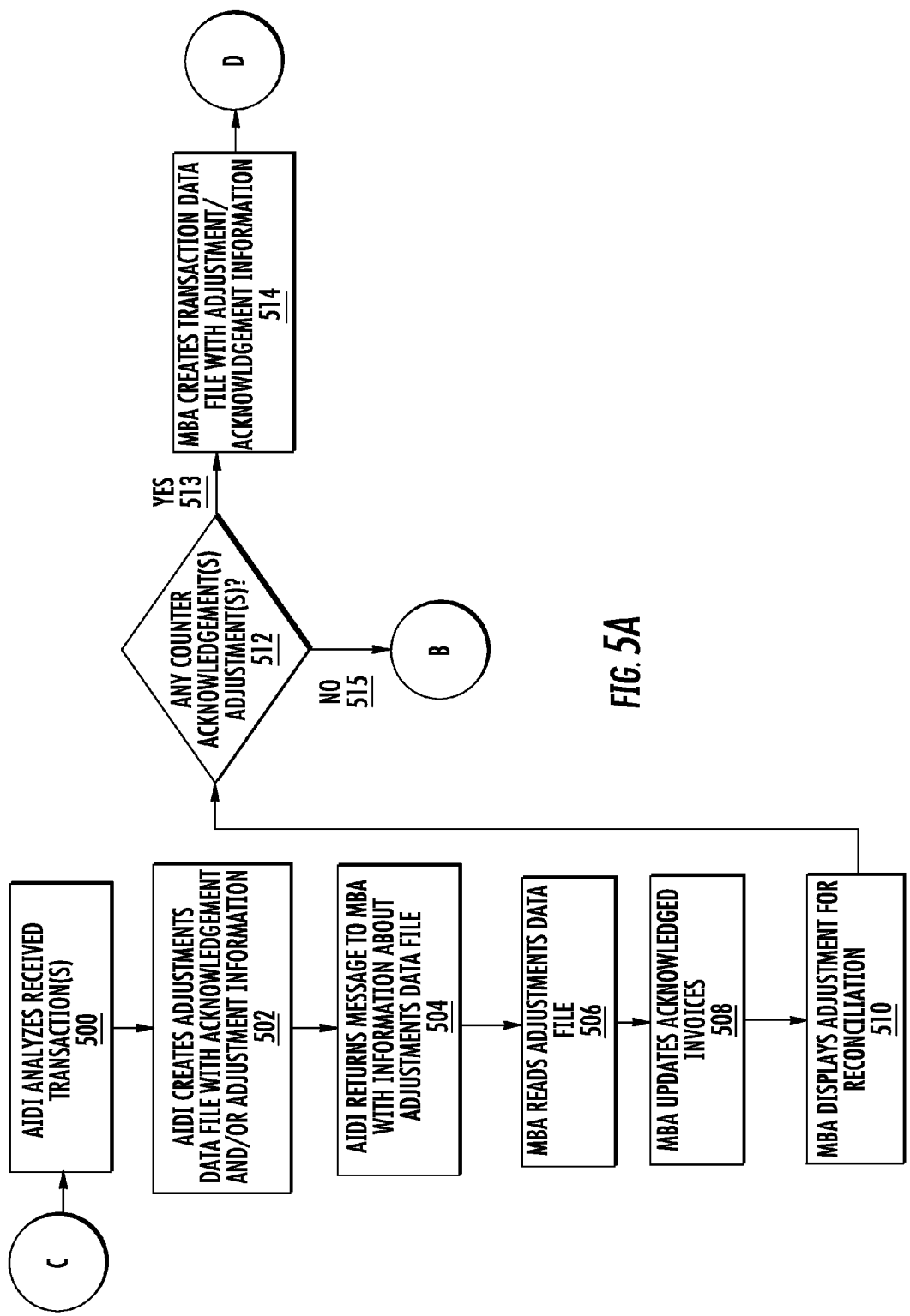
FIG. 5A is a flow chart and FIG. 5B is a corresponding schematic of the reconciliation process according to one embodiment of the disclosed subject matter.
Figure 5B:
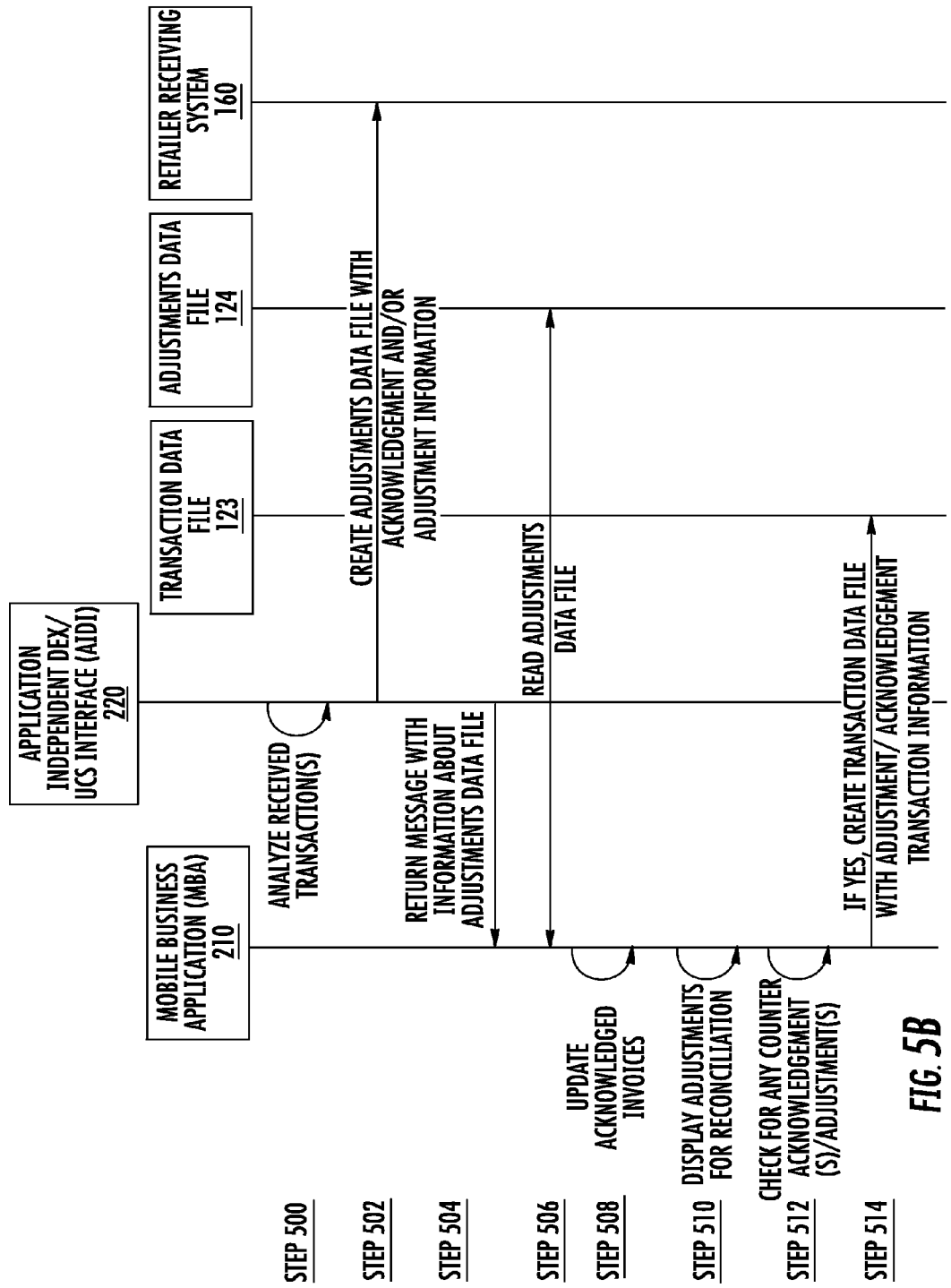

Connector C from FIG. 4A continues then in FIG. 5A. FIG. 5A is a flow chart and FIG. 5B is a corresponding schematic of the reconciliation process according to one embodiment of the disclosed subject matter. The AIDI begins by analyzing the received transaction(s) from the retailer receiving system 160 (Step 500). The AIDI reports the results by creating an adjustments data file 124 with the acknowledgment and/or adjustment information (Step 502). The AIDI returns a message to the MBA with information about the adjustments data file 124 (Step 504). In some embodiments, the information about the adjustments data file is the file location information for the adjustments data file, i.e. the name of the adjustments data file and/or the path to the adjustments data file, which may be a path to the adjustments data file in the storage repository 114 on the DSD device 110, i.e. a local path, or a path to the adjustments data file on the network, either a local area network (LAN) or a wide area network (WAN), and the MBA reads the adjustments data file using the file location information. In alternative embodiments, the AIDI returns a message to the MBA including the contents of the adjustments data file. The MBA reads the adjustments data file 124 in Step 506, and it updates acknowledged invoices in Step 508, and then displays adjustment information for reconciliation on the visual output 116 of the DSD device 110 in Step 510. The MBA then may have counter-adjustments or acknowledgments to send back to the retailer (Step 512). If there are counter-adjustments, then the MBA creates the transaction data file 123, which as discussed above, may be the same file or a new file depending upon the embodiment, with the adjustment/acknowledgment information (Step 514). The process then continues as indicated by Connector D which returns to FIG. 2A where the process repeats until there are no more DEX/UCS transactions to process and the DEX/UCS processing is complete (Step 404). Otherwise, if there are no counter-adjustments or acknowledgment information to send, the process continues as indicated by connector B which returns to FIG. 4A where the process repeats until there are no more DEX/UCS transactions to process and the DEX/UCS processing is complete.

To supplement the present disclosure, this application incorporates entirely by reference the following commonly assigned patents, patent application publications, and patent applications: U.S. Pat. No. 6,832,725; U.S. Pat. No. 7,128,266; U.S. Pat. No. 7,159,783; U.S. Pat. No. 7,413,127; U.S. Pat. No. 7,726,575; U.S. Pat. No. 8,294,969; U.S. Pat. No. 8,317,105; U.S. Pat. No. 8,322,622; U.S. Pat. No. 8,366,005; U.S. Pat. No. 8,371,507; U.S. Pat. No. 8,376,233; U.S. Pat. No. 8,381,979; U.S. Pat. No. 8,390,909; U.S. Pat. No. 8,408,464; U.S. Pat. No. 8,408,468; U.S. Pat. No. 8,408,469; U.S. Pat. No. 8,424,768; U.S. Pat. No. 8,448,863; U.S. Pat. No. 8,457,013; U.S. Pat. No. 8,459,557; U.S. Pat. No. 8,469,272; U.S. Pat. No. 8,474,712; U.S. Pat. No. 8,479,992; U.S. Pat. No. 8,490,877; U.S. Pat. No. 8,517,271; U.S. Pat. No. 8,523,076; U.S. Pat. No. 8,528,818; U.S. Pat. No. 8,544,737; U.S. Pat. No. 8,548,242; U.S. Pat. No. 8,548,420; U.S. Pat. No. 8,550,335; U.S. Pat. No. 8,550,354; U.S. Pat. No. 8,550,357; U.S. Pat. No. 8,556,174; U.S. Pat. No. 8,556,176; U.S. Pat. No. 8,556,177; U.S. Pat. No. 8,559,767; U.S. Pat. No. 8,599,957; U.S. Pat. No. 8,561,895; U.S. Pat. No. 8,561,903; U.S. Pat. No. 8,561,905; U.S. Pat. No. 8,565,107; U.S. Pat. No. 8,571,307; U.S. Pat. No. 8,579,200; U.S. Pat. No. 8,583,924; U.S. Pat. No. 8,584,945; U.S. Pat. No. 8,587,595; U.S. Pat. No. 8,587,697; U.S. Pat. No. 8,588,869; U.S. Pat. No. 8,590,789; U.S. Pat. No. 8,596,539; U.S. Pat. No. 8,596,542; U.S. Pat. No. 8,596,543; U.S. Pat. No. 8,599,271; U.S. Pat. No. 8,599,957; U.S. Pat. No. 8,600,158; U.S. Pat. No. 8,600,167; U.S. Pat. No. 8,602,309; U.S. Pat. No. 8,608,053; U.S. Pat. No. 8,608,071; U.S. Pat. No. 8,611,309; U.S. Pat. No. 8,615,487; U.S. Pat. No. 8,616,454; U.S. Pat. No. 8,621,123; U.S. Pat. No. 8,622,303; U.S. Pat. No. 8,628,013; U.S. Pat. No. 8,628,015; U.S. Pat. No. 8,628,016; U.S. Pat. No. 8,629,926; U.S. Pat. No. 8,630,491; U.S. Pat. No. 8,635,309; U.S. Pat. No. 8,636,200; U.S. Pat. No. 8,636,212; U.S. Pat. No. 8,636,215; U.S. Pat. No. 8,636,224; U.S. Pat. No. 8,638,806; U.S. Pat. No. 8,640,958; U.S. Pat. No. 8,640,960; U.S. Pat. No. 8,643,717; U.S. Pat. No. 8,646,692; U.S. Pat. No. 8,646,694; U.S. Pat. No. 8,657,200; U.S. Pat. No. 8,659,397; U.S. Pat. No. 8,668,149; U.S. Pat. No. 8,678,285; U.S. Pat. No. 8,678,286; U.S. Pat. No. 8,682,077; U.S. Pat. No. 8,687,282; U.S. Pat. No. 8,692,927; U.S. Pat. No. 8,695,880; U.S. Pat. No. 8,698,949; U.S. Pat. No. 8,717,494; U.S. Pat. No. 8,717,494; U.S. Pat. No. 8,720,783; U.S. Pat. No. 8,723,804; U.S. Pat. No. 8,723,904; U.S. Pat. No. 8,727,223; U.S. Pat. No. D702,237; U.S. Pat. No. 8,740,082; U.S. Pat. No. 8,740,085; U.S. Pat. No. 8,746,563; U.S. Pat. No. 8,750,445; U.S. Pat. No. 8,752,766; U.S. Pat. No. 8,756,059; U.S. Pat. No. 8,757,495; U.S. Pat. No. 8,760,563; U.S. Pat. No. 8,763,909; U.S. Pat. No. 8,777,108; U.S. Pat. No. 8,777,109; U.S. Pat. No. 8,779,898; U.S. Pat. No. 8,781,520; U.S. Pat. No. 8,783,573; U.S. Pat. No. 8,789,757; U.S. Pat. No. 8,789,758; U.S. Pat. No. 8,789,759; U.S. Pat. No. 8,794,520; U.S. Pat. No. 8,794,522; U.S. Pat. No. 8,794,526; U.S. Pat. No. 8,798,367; U.S. Pat. No. 8,807,431; U.S. Pat. No. 8,807,432; U.S. Pat. No. 8,820,630;

International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2011/0202554;
U.S. Patent Application Publication No. 2012/0111946;
U.S. Patent Application Publication No. 2012/0138685;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0056285;
U.S. Patent Application Publication No. 2013/0070322;
U.S. Patent Application Publication No. 2013/0075168;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0200158;
U.S. Patent Application Publication No. 2013/0256418;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0278425;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306730;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0341399;
U.S. Patent Application Publication No. 2013/0342717;
U.S. Patent Application Publication No. 2014/0001267;
U.S. Patent Application Publication No. 2014/0002828;
U.S. Patent Application Publication No. 2014/0008430;
U.S. Patent Application Publication No. 2014/0008439;
U.S. Patent Application Publication No. 2014/0025584;
U.S. Patent Application Publication No. 2014/0027518;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061305;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0075846;
U.S. Patent Application Publication No. 2014/0076974;
U.S. Patent Application Publication No. 2014/0078341;
U.S. Patent Application Publication No. 2014/0078342;
U.S. Patent Application Publication No. 2014/0078345;
U.S. Patent Application Publication No. 2014/0084068;
U.S. Patent Application Publication No. 2014/0097249;
U.S. Patent Application Publication No. 2014/0098792;
U.S. Patent Application Publication No. 2014/0100774;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0108682;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0160329;
U.S. Patent Application Publication No. 2014/0166755;
U.S. Patent Application Publication No. 2014/0166757;
U.S. Patent Application Publication No. 2014/0166759;
U.S. Patent Application Publication No. 2014/0166760;
U.S. Patent Application Publication No. 2014/0166761;
U.S. Patent Application Publication No. 2014/0168787;
U.S. Patent Application Publication No. 2014/0175165;
U.S. Patent Application Publication No. 2014/0175169;
U.S. Patent Application Publication No. 2014/0175172;
U.S. Patent Application Publication No. 2014/0175174;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0203087;
U.S. Patent Application Publication No. 2014/0204268;
U.S. Patent Application Publication No. 2014/0214631;
U.S. Patent Application Publication No. 2014/0217166;
U.S. Patent Application Publication No. 2014/0217180;
U.S. patent application Ser. No. 13/367,978 for a Laser Scanning Module Employing an Elastomeric U-Hinge Based Laser Scanning Assembly, filed Feb. 7, 2012 (Feng et al.);

U.S. patent application Ser. No. 29/436,337 for an Electronic Device, filed Nov. 5, 2012 (Fitch et al.);

U.S. patent application Ser. No. 13/771,508 for an Optical Redirection Adapter, filed Feb. 20, 2013 (Anderson);

U.S. patent application Ser. No. 13/852,097 for a System and Method for Capturing and Preserving Vehicle Event Data, filed Mar. 28, 2013 (Barker et al.);

U.S. patent application Ser. No. 13/902,110 for a System and Method for Display of Information Using a Vehicle-Mount Computer, filed May 24, 2013 (Hollifield);

U.S. patent application Ser. No. 13/902,144, for a System and Method for Display of Information Using a Vehicle-Mount Computer, filed May 24, 2013 (Chamberlin);

U.S. patent application Ser. No. 13/902,242 for a System For Providing A Continuous Communication Link With A Symbol Reading Device, filed May 24, 2013 (Smith et al.);

U.S. patent application Ser. No. 13/912,262 for a Method of Error Correction for 3D Imaging Device, filed Jun. 7, 2013 (Jovanovski et al.);

U.S. patent application Ser. No. 13/912,702 for a System and Method for Reading Code Symbols at Long Range Using Source Power Control, filed Jun. 7, 2013 (Xian et al.);

U.S. patent application Ser. No. 29/458,405 for an Electronic Device, filed Jun. 19, 2013 (Fitch et al.);

U.S. patent application Ser. No. 13/922,339 for a System and Method for Reading Code Symbols Using a Variable Field of View, filed Jun. 20, 2013 (Xian et al.);

U.S. patent application Ser. No. 13/927,398 for a Code Symbol Reading System Having Adaptive Autofocus, filed Jun. 26, 2013 (Todeschini);

U.S. patent application Ser. No. 13/930,913 for a Mobile Device Having an Improved User Interface for Reading Code Symbols, filed Jun. 28, 2013 (Gelay et al.);

U.S. patent application Ser. No. 29/459,620 for an Electronic Device Enclosure, filed Jul. 2, 2013 (London et al.);

U.S. patent application Ser. No. 29/459,681 for an Electronic Device Enclosure, filed Jul. 2, 2013 (Chaney et al.);

U.S. patent application Ser. No. 13/933,415 for an Electronic Device Case, filed Jul. 2, 2013 (London et al.);

U.S. patent application Ser. No. 29/459,785 for a Scanner and Charging Base, filed Jul. 3, 2013 (Fitch et al.);

U.S. patent application Ser. No. 29/459,823 for a Scanner, filed Jul. 3, 2013 (Zhou et al.);

U.S. patent application Ser. No. 13/947,296 for a System and Method for Selectively Reading Code Symbols, filed Jul. 22, 2013 (Rueblinger et al.);

U.S. patent application Ser. No. 13/950,544 for a Code Symbol Reading System Having Adjustable Object Detection, filed Jul. 25, 2013 (Jiang);

U.S. patent application Ser. No. 13/961,408 for a Method for Manufacturing Laser Scanners, filed Aug. 7, 2013 (Saber et al.);

U.S. patent application Ser. No. 14/018,729 for a Method for Operating a Laser Scanner, filed Sep. 5, 2013 (Feng et al.);

U.S. patent application Ser. No. 14/019,616 for a Device Having Light Source to Reduce Surface Pathogens, filed Sep. 6, 2013 (Todeschini);

U.S. patent application Ser. No. 14/023,762 for a Handheld Indicia Reader Having Locking Endcap, filed Sep. 11, 2013 (Gannon);

U.S. patent application Ser. No. 14/035,474 for Augmented-Reality Signature Capture, filed Sep. 24, 2013 (Todeschini);

U.S. patent application Ser. No. 29/468,118 for an Electronic Device Case, filed Sep. 26, 2013 (Oberpriller et al.);

U.S. patent application Ser. No. 14/055,234 for Dimensioning System, filed Oct. 16, 2013 (Fletcher);

U.S. patent application Ser. No. 14/053,314 for Indicia Reader, filed Oct. 14, 2013 (Huck);

U.S. patent application Ser. No. 14/065,768 for Hybrid System and Method for Reading Indicia, filed Oct. 29, 2013 (Meier et al.);

U.S. patent application Ser. No. 14/074,746 for Self-Checkout Shopping System, filed Nov. 8, 2013 (Hejl et al.);

U.S. patent application Ser. No. 14/074,787 for Method and System for Configuring Mobile Devices via NFC Technology, filed Nov. 8, 2013 (Smith et al.);

U.S. patent application Ser. No. 14/087,190 for Optimal Range Indicators for Bar Code Validation, filed Nov. 22, 2013 (Hejl);

U.S. patent application Ser. No. 14/094,087 for Method and System for Communicating Information in a Digital Signal, filed Dec. 2, 2013 (Peake et al.);

U.S. patent application Ser. No. 14/101,965 for High Dynamic-Range Indicia Reading System, filed Dec. 10, 2013 (Xian);

U.S. patent application Ser. No. 14/150,393 for Indicia-reader Having Unitary Construction Scanner, filed Jan. 8, 2014 (Colavito et al.);

U.S. patent application Ser. No. 14/154,207 for Laser Barcode Scanner, filed Jan. 14, 2014 (Hou et al.);

U.S. patent application Ser. No. 14/165,980 for System and Method for Measuring Irregular Objects with a Single Camera filed Jan. 28, 2014 (Li et al.);

U.S. patent application Ser. No. 14/166,103 for Indicia Reading Terminal Including Optical Filter filed Jan. 28, 2014 (Lu et al.);

U.S. patent application Ser. No. 14/200,405 for Indicia Reader for Size-Limited Applications filed Mar. 7, 2014 (Feng et al.);

U.S. patent application Ser. No. 14/231,898 for Hand-Mounted Indicia-Reading Device with Finger Motion Triggering filed Apr. 1, 2014 (Van Horn et al.);

U.S. patent application Ser. No. 14/250,923 for Reading Apparatus Having Partial Frame Operating Mode filed Apr. 11, 2014, (Deng et al.);

U.S. patent application Ser. No. 14/257,174 for Imaging Terminal Having Data Compression filed Apr. 21, 2014, (Barber et al.);

U.S. patent application Ser. No. 14/257,364 for Docking System and Method Using Near Field Communication filed Apr. 21, 2014 (Showering);

U.S. patent application Ser. No. 14/264,173 for Autofocus Lens System for Indicia Readers filed Apr. 29, 2014 (Ackley et al.);

U.S. patent application Ser. No. 14/274,858 for Mobile Printer with Optional Battery Accessory filed May 12, 2014 (Marty et al.);

U.S. patent application Ser. No. 14/277,337 for MULTI-PURPOSE OPTICAL READER, filed May 14, 2014 (Jovanovski et al.);

U.S. patent application Ser. No. 14/283,282 for TERMINAL HAVING ILLUMINATION AND FOCUS CONTROL filed May 21, 2014 (Liu et al.);

U.S. patent application Ser. No. 14/300,276 for METHOD AND SYSTEM FOR CONSIDERING INFORMATION ABOUT AN EXPECTED RESPONSE WHEN PERFORMING SPEECH RECOGNITION, filed Jun. 10, 2014 (Braho et al.);

U.S. patent application Ser. No. 14/305,153 for INDICIA READING SYSTEM EMPLOYING DIGITAL GAIN CONTROL filed Jun. 16, 2014 (Xian et al.);

U.S. patent application Ser. No. 14/310,226 for AUTOFOCUSING OPTICAL IMAGING DEVICE filed Jun. 20, 2014 (Koziol et al.);

U.S. patent application Ser. No. 14/327,722 for CUSTOMER FACING IMAGING SYSTEMS AND METHODS FOR OBTAINING IMAGES filed Jul. 10, 2014 (Oberpriller et al);

U.S. patent application Ser. No. 14/327,827 for a MOBILE-PHONE ADAPTER FOR ELECTRONIC TRANSACTIONS, filed Jul. 10, 2014 (Hejl);

U.S. patent application Ser. No. 14/329,303 for CELL PHONE READING MODE USING IMAGE TIMER filed Jul. 11, 2014 (Coyle);

U.S. patent application Ser. No. 14/333,588 for SYMBOL READING SYSTEM WITH INTEGRATED SCALE BASE filed Jul. 17, 2014 (Barten);

U.S. patent application Ser. No. 14/334,934 for a SYSTEM AND METHOD FOR INDICIA VERIFICATION, filed Jul. 18, 2014 (Hejl);

U.S. patent application Ser. No. 14/336,188 for METHOD OF AND SYSTEM FOR DETECTING OBJECT WEIGHING INTERFERENCES, Filed Jul. 21, 2014 (Amundsen et al.);

U.S. patent application Ser. No. 14/339,708 for LASER SCANNING CODE SYMBOL READING SYSTEM, filed Jul. 24, 2014 (Xian et al.);

U.S. patent application Ser. No. 14/340,627 for an AXIALLY REINFORCED FLEXIBLE SCAN ELEMENT, filed Jul. 25, 2014 (Rueblinger et al.);

U.S. patent application Ser. No. 14/340,716 for an OPTICAL IMAGER AND METHOD FOR CORRELATING A MEDICATION PACKAGE WITH A PATIENT, filed Jul. 25, 2014 (Ellis);

U.S. patent application Ser. No. 14/342,544 for Imaging Based Barcode Scanner Engine with Multiple Elements Supported on a Common Printed Circuit Board filed Mar. 4, 2014 (Liu et al.);

U.S. patent application Ser. No. 14/345,735 for Optical Indicia Reading Terminal with Combined Illumination filed Mar. 19, 2014 (Ouyang);

U.S. patent application Ser. No. 14/336,188 for METHOD OF AND SYSTEM FOR DETECTING OBJECT WEIGHING INTERFERENCES, Filed Jul. 21, 2014 (Amundsen et al.);

U.S. patent application Ser. No. 14/355,613 for Optical Indicia Reading Terminal with Color Image Sensor filed May 1, 2014 (Lu et al.);

U.S. patent application Ser. No. 14/370,237 for WEB-BASED SCAN-TASK ENABLED SYSTEM AND METHOD OF AND APPARATUS FOR DEVELOPING AND DEPLOYING THE SAME ON A CLIENT-SERVER NETWORK filed Jul. 2, 2014 (Chen et al.);

U.S. patent application Ser. No. 14/370,267 for INDUSTRIAL DESIGN FOR CONSUMER DEVICE BASED SCANNING AND MOBILITY, filed Jul. 2, 2014 (Ma et al.);

U.S. patent application Ser. No. 14/376,472, for an ENCODED INFORMATION READING TERMINAL INCLUDING HTTP SERVER, filed Aug. 4, 2014 (Lu);

U.S. patent application Ser. No. 14/379,057 for METHOD OF USING CAMERA SENSOR INTERFACE TO TRANSFER MULTIPLE CHANNELS OF SCAN DATA USING AN IMAGE FORMAT filed Aug. 15, 2014 (Wang et al.);

U.S. patent application Ser. No. 14/452,697 for INTERACTIVE INDICIA READER, filed Aug. 6, 2014 (Todeschini);

U.S. patent application Ser. No. 14/453,019 for DIMENSIONING SYSTEM WITH GUIDED ALIGNMENT, filed Aug. 6, 2014 (Li et al.);

U.S. patent application Ser. No. 14/460,387 for APPARATUS FOR DISPLAYING BAR CODES FROM LIGHT EMITTING DISPLAY SURFACES filed Aug. 15, 2014 (Van Horn et al.);

U.S. patent application Ser. No. 14/460,829 for ENCODED INFORMATION READING TERMINAL WITH WIRELESS PATH SELECTION CAPABILITY, filed Aug. 15, 2014 (Wang et al.);

U.S. patent application Ser. No. 14/462,801 for MOBILE COMPUTING DEVICE WITH DATA COGNITION SOFTWARE, filed on Aug. 19, 2014 (Todeschini et al.);

U.S. patent application Ser. No. 14/446,387 for INDICIA READING TERMINAL PROCESSING PLURALITY OF FRAMES OF IMAGE DATA RESPONSIVELY TO TRIGGER SIGNAL ACTIVATION filed Jul. 30, 2014 (Wang et al.);

U.S. patent application Ser. No. 14/446,391 for MULTIFUNCTION POINT OF SALE APPARATUS WITH OPTICAL SIGNATURE CAPTURE filed Jul. 30, 2014 (Good et al.);

U.S. patent application Ser. No. 29/486,759 for an Imaging Terminal, filed Apr. 2, 2014 (Oberpriller et al.);

U.S. patent application Ser. No. 29/492,903 for an INDICIA SCANNER, filed Jun. 4, 2014 (Zhou et al.); and U.S. patent application Ser. No. 29/494,725 for an IN-COUNTER BARCODE SCANNER, filed Jun. 24, 2014 (Oberpriller et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A device, comprising:
   at least one communication interface;
   at least one storage repository;
   a control system communicatively coupled to the at least one communication interface and the at least one storage repository and comprising at least one hardware processor and a memory storing at least one first program code, and at least one second program code, wherein:
   the at least one first program code is operable to:
      receive transaction information;
      create a first data file in the storage repository, wherein the first data file is based on the transaction information;
      send a message to the at least one second program code to initiate a creation of one or more Direct Exchange/Uniform Communication Standard (DEX/UCS) transactions from the transaction information, the DEX/UCS transactions being in an exchange format comprising a DEX/UCS format;
      receive a message from the at least one second program code denoting success or failure of the creation of the one or more DEX/UCS transactions from the transaction information in the exchange format; and
   the at least one second program code is operable to:
      receive a message from the at least one first program code to initiate a creation of the one or more DEX/UCS transactions from the transaction information in the exchange format;
      read the transaction information from the first data file;

create the one or more DEX/UCS transactions from the transaction information in the exchange format; and
send a message to the at least one first program code denoting success or failure of the creation of the one or more DEX/UCS transactions from the transaction information in the exchange format.

2. The device of claim 1, wherein the transaction information is selected from the group consisting of: sales information, return information, adjustment information, and counter-adjustment information.

3. The device of claim 1, wherein the message is of a type selected from the group consisting of: a signal, an inter-process communication, and a notification.

4. The device of claim 1, wherein the exchange format is administered by GS1.

5. The device of claim 1, wherein:
the at least one first program code is further operable to:
issue a prompt for a connection to a second device;
send a signal to the second program code to initiate a communication of the one or more DEX/UCS transactions from the transaction information in the exchange format;
receive a message from the at least one second program code denoting success or failure of the communication of the one or more DEX/UCS transactions in the exchange format; and
the at least one second program code is further operable to:
receive a message from the at least one first program code to initiate the communication of the one or more DEX/UCS transactions in the exchange format;
exchange the one or more DEX/UCS transactions with the second device; and
send a message to the at least one first program code denoting success or failure of the communication of the one or more DEX/UCS transactions to the second device.

6. The device of claim 5, wherein the communication is of a type selected from the group of: a sending communication and a receiving communication.

7. The device of claim 5, wherein:
the at least one first program code is further operable to:
receive a message from the at least second program code including information about a second data file comprising adjustments to the transaction information, the adjustments pertaining to one or more acknowledged transactions;
read the second data file;
update the transaction information corresponding to the one or more acknowledged transactions;
display the transaction information corresponding to transactions that require reconciliation;
determine if there is additional transaction information;
if there is additional transaction information, receive the additional transaction information and create a third data file in the storage repository, wherein the third data file is based on the additional transaction information; and
the at least one second program code is further operable to:
analyze the transaction information exchanged with the second device;
create the second data file in the storage repository, wherein the second data file is based on analyzed transaction information; and
send a message to the at least one first program code including information about the second data file.

8. The device of claim 7, wherein the additional transaction information is selected from the group consisting of: sales information, return information, adjustment information, and counter-adjustment information.

9. The device of claim 7, wherein the third data file and the first data file are the same file.

10. The device of claim 7, wherein the information about the second data file includes the location of the file in the storage repository.

11. A system, comprising:
a first device comprising:
at least one communication interface;
at least one storage repository;
a control system communicatively coupled to the at least one communication interface and the at least one storage repository and comprising at least one hardware processor and a memory storing program codes operable to:
receive transaction information;
create a first data file in the storage repository, wherein the first data file is based on the transaction information;
send a message to the at least one second program code to initiate a creation of one or more Direct Exchange/Uniform Communication Standard (DEX/UCS) transactions from the transaction information in an exchange format;
receive a message from the at least one second program code denoting success or failure of the creation of the one or more DEX/UCS transactions from the transaction information in the exchange format; and
a second device comprising:
at least one communication interface;
at least one storage repository;
a control system communicatively coupled to the at least one communication interface and the at least one storage repository and comprising at least one hardware processor and a memory storing program codes operable to:
receive a message from the at least one first program code to initiate a creation of the one or more DEX/UCS transactions in the exchange format;
read the transaction information from the first data file;
create the one or more DEX/UCS transactions in the exchange format; and
send a message to the at least one first program code denoting success or failure of the creation of the one or more DEX/UCS transactions in the exchange format.

12. The system of claim 11, wherein the transaction information is selected from the group consisting of: sales information, return information, adjustment information, and counter-adjustment information.

13. The system of claim 11, wherein the message is of a type selected from the group consisting of: a signal, an inter-process communication, and a notification.

14. The system of claim 11, wherein the exchange format is administered by GS1.

15. The system of claim 11, wherein:
the control system of the first device is further operable to:
issue a prompt for a connection to a third device;

send a signal to the second program code to initiate a communication of the one or more DEX/UCS transactions from the transaction information in an exchange format;

receive a message from the at least one second program code denoting success or failure of the communication of the one or more DEX/UCS transactions in the exchange format; and the control system of the second device is further operable to:

receive a message from the at least one first program code to initiate the communication of the one or more DEX/UCS transactions in the exchange format;

exchange the one or more DEX/UCS transactions with the third device; and send a message to the at least one first program code denoting success or failure of the communication of the one or more DEX/UCS transactions to the third device.

16. The system of claim 15, wherein the communication is of a type selected from the group of: a sending communication and a receiving communication.

17. The system of claim 15, wherein:

the control system of the first device is further operable to:

receive a message from the at least second program code including information about a second data file comprising adjustments to the transaction information, the adjustments pertaining to one or more acknowledged transactions;

read the second data file;

update the transaction information corresponding to the one or more acknowledged transactions;

display the transaction information corresponding to transactions that require reconciliation;

determine if there is additional transaction information;

if there is additional transaction information, receive the additional transaction information and create a third data file in the storage repository, wherein the third data file is based on the additional transaction information; and the control system of the second device is further operable to:

analyze the transaction information exchanged with the third device;

create the second data file in the storage repository, wherein the second data file is based on analyzed transaction information; and send a message to the at least one first program code including information about the second data file.

18. The system of claim 17, wherein the additional transaction information is selected from the group consisting of: sales information, return information, adjustment information, and counter-adjustment information.

19. The system of claim 17, wherein the third data file and the first data file are the same file.

20. The system of claim 17, wherein the information about the second data file includes the location of the file in the storage repository.

21. The device of claim 1, wherein the second program code corresponds to an application independent DEX/UCS interface (AIDI).

22. The device of claim 1, wherein the first program code corresponds to a mobile business application (MBA).

* * * * *